US012756133B2

(12) United States Patent
Yang

(10) Patent No.: US 12,756,133 B2
(45) Date of Patent: Oct. 6, 2026

(54) CONNECTOR MODULE AND SIGNAL TRANSMISSION CABLE

(71) Applicant: ELKA INTERNATIONAL LTD., New Taipei City (TW)

(72) Inventor: Jui-Ming Yang, New Taipei City (TW)

(73) Assignee: ELKA INTERNATIONAL LTD., New Taipei City (TW)

( * ) Notice: Subject to any disclaimer, the term of this patent is extended or adjusted under 35 U.S.C. 154(b) by 380 days.

(21) Appl. No.: 18/636,838

(22) Filed: Apr. 16, 2024

(65) Prior Publication Data

US 2024/0364042 A1 Oct. 31, 2024

(30) Foreign Application Priority Data

Apr. 28, 2023 (TW) ................................ 112204130

(51) Int. Cl.
*H01R 13/502* (2006.01)
*H01R 13/66* (2006.01)

(52) U.S. Cl.
CPC ....... *H01R 13/502* (2013.01); *H01R 13/6608* (2013.01)

(58) Field of Classification Search
CPC .......................... H01R 13/502; H01R 13/6608
USPC .................................... 439/620.22, 626, 630
See application file for complete search history.

(56) References Cited

U.S. PATENT DOCUMENTS

| | | | | |
|---|---|---|---|---|
| 7,758,374 | B2 * | 7/2010 | Yu | H01R 24/60 439/493 |
| 9,310,572 | B2 * | 4/2016 | Keenum | G02B 6/428 |
| 9,437,982 | B2 * | 9/2016 | Wu | H01R 43/20 |
| 9,484,689 | B2 * | 11/2016 | Wu | H01R 24/60 |
| 9,680,260 | B2 * | 6/2017 | Fan | H01R 13/6593 |
| 9,698,540 | B2 * | 7/2017 | Xing | H01R 13/6593 |
| 9,780,490 | B2 * | 10/2017 | Xing | H01R 13/64 |
| 9,887,497 | B1 * | 2/2018 | Rajagopalan | H01R 13/6594 |
| 10,333,263 | B2 * | 6/2019 | Wu | H01R 24/64 |
| 10,622,767 | B2 * | 4/2020 | Wu | H01R 13/6658 |
| 10,777,951 | B2 * | 9/2020 | Wu | H05K 1/117 |
| 11,121,483 | B2 * | 9/2021 | Nakai | H01R 4/184 |
| 11,404,828 | B2 * | 8/2022 | Zhang | H01R 12/707 |
| 2014/0073183 | A1 * | 3/2014 | Golko | H01R 13/6658 439/607.34 |
| 2015/0171561 | A1 * | 6/2015 | Little | H01R 13/6581 439/607.34 |
| 2015/0288107 | A1 * | 10/2015 | Wu | H01R 13/6593 439/357 |
| 2016/0079689 | A1 * | 3/2016 | Wu | B23K 26/32 228/180.21 |

* cited by examiner

*Primary Examiner* — Harshad C Patel

(74) *Attorney, Agent, or Firm* — Birch, Stewart, Kolasch & Birch, LLP

(57) ABSTRACT

A connector module for connecting a cable. The connector module comprises a connector, a circuit adapter board, a shell and a first insulation sheet. The connector has at least one terminal pin and a housing. The circuit adapter board is configured to electrically connect with the at least one terminal pin and at least one wire of the cable. The shell is configured to cover the circuit adapter board and at least a portion of the housing. The first insulation sheet is arranged over a first surface of the circuit adapter board, and located in the shell. Wherein the first insulation sheet has an inner concave structure to form a space between the first insulation sheet and the first surface.

18 Claims, 9 Drawing Sheets

CONNECTOR MODULE AND SIGNAL TRANSMISSION CABLE

TECHNICAL FIELD

The present disclosure relates to a connector module and a signal transmission cable, particularly a connector module and a signal transmission cable having at least one insulation sheet.

BACKGROUND

To avoid short-circuits between the circuit connection board and the external shell of the connector module or to enhance the structural strength of the welding part of the circuit connection board, curing agents (such as PE and PVC) may be used to form an isolation mold on the circuit connection board. After arranging the curing agents, the curing agent will improve the structural strength of the welding part for connecting the circuit connection board and cable. Besides, the curing agent with conductive insulation further protects the circuit components or conducting parts on the circuit connection board to avoid short circuits with the shell or other conductors.

Although padding with the curing agents is convenient and easy to apply, the implementation and processes are complex to unify. For example, the position for using the curing and the quantity or quality of the curing agent are easily varied during each production. The covered area, the volume, and the thickness of the curing agent on the circuit connection board are difficult to control, so the quality is unstable. Besides, defects such as bubbles in the cured agent also affect isolation performance. Therefore, producing products with uniform quality is difficult, affecting product yield.

Moreover, filling the curing agent only improves mechanical properties, and the electrical demand of the circuit connection board is not considered. Especially in high-frequency signal transmission, varied electrical parameters (such as dielectric coefficient) cause a more severe impact on the product's function. For example, when designing a circuit for a connector module, the impedance matching among components and/or connecting wires should be well evaluated and modified to achieve better impedance matching and transmission effects. Therefore, the dielectric coefficient of mediums around the circuit affects the impedance, especially in high-frequency signal transmission. For example, when considering air as the surrounding medium for designing the circuit, the curing agent covered the circuit components and/or conductive wires results in impedance shift (such as the change of the capacitance and/or inductance value) to causing the mismatch of impedance among the components on the circuit connection board. Specifically, the dielectric coefficient of the curing agent differs from that of air (e.g., the dielectric coefficient of PE or PVC is approximately 3 to 4 times larger than air). Accordingly, the mismatched impedance will affect the transmission efficiency of the connector module when transmitting high-frequency signals.

Even considering the curing agent as the surrounding medium for designing the circuit, the impedances also vary due to the different arrangements of the curing agent. Because the impedances influenced by the curing agent cannot be evaluated, there are errors or shifts between the actual and estimated impedance values. The mistakes or shifts of impedances cause the circuit impedances to be unable to match. Accordingly, the mismatched impedance affects the transmission efficiency of the connector module during the transmission of high-frequency signals.

The circuit's mismatched impedances cause reflection, crosstalk, and/or attenuation of the transmission signal. Therefore, the connector module's transmission efficiency decreases. When the transmission signal's frequency increases, the problem becomes significant. Therefore, the produced product cannot meet standard specifications or experience instability or interruption in transmitting high-frequency signals.

Therefore, the main issues in the technical field are how to maintain impedance matching while improving the structural strength and insulation protection of the product and avoid problems such as signal reflection, crosstalk, and/or attenuation that affect transmission efficiency when transmitting high-frequency signals.

SUMMARY

One object of the present disclosure is to improve the structure strength and insulation protection of the connector module's circuits.

One objective of the present disclosure is to eliminate the impedance mismatch of the connector module during high-frequency transmission, which is caused by the surrounding medium of the connector module's circuit.

The present disclosure provides a connector module for connecting a cable. The connector module comprises a connector, a circuit adapter board, a shell, and a first insulation sheet. The connector has at least one terminal pin and a housing. The circuit adapter board is configured to connect with at least one terminal pin electrically and at least one cable wire. The shell is configured to cover the circuit adapter board and at least a portion of the housing. The first insulation sheet is arranged over the first surface of the circuit adapter board and located in the shell. The first insulation sheet has an inner concave structure, forming a space between the first and the first surface.

The present disclosure provides a signal transmission cable. The signal transmission cable comprises a cable and a connector module arranged in a cable terminal. The connector module comprises a connector, a circuit adapter board, a shell, and a first insulation sheet. The connector has at least one terminal pin and a housing. The circuit adapter board is configured to connect with at least one terminal pin electrically and at least one cable wire. The shell is configured to cover the circuit adapter board and at least a portion of the housing. The first insulation sheet is arranged over the first surface of the circuit adapter board, the first surface of the circuit adapter board, and located in the shell. Wherein the first insulation sheet has an inner concave structure to form a space between the first insulation sheet and the first surface. Wherein at least one cable wire is electrically connected through the circuit adapter board to at least one terminal pin of the connector.

The insulation sheet is arranged to protect the circuit adapter board. The insulation sheet covered by the shell also improves the structural strength of the circuit adapter board. In addition, the inner concave structure of the insulation sheet provides a surrounding medium for the circuit components on the circuit adapter board. The dielectric coefficient of the surrounding medium made by the insulation sheet is selectable and/or adjustable. Therefore, the dielectric coefficient of the circuit components can be estimated or controlled. A stable medium with a controllable dielectric coefficient will prevent the design errors of the circuit adapter board, which are caused by shifting the estimated impedance. The impedance matching will fit the original design, and the signal transmission efficiency will not be affected by the surrounding medium of the circuit adapter board during high-frequency transmission.

BRIEF DESCRIPTION OF THE DRAWINGS

The accompanying drawings help describe various aspects of the present invention. To simplify and highlight the contents, conventional structures or elements may be drawn in a simple schematic way or omitted. For example, a number of elements may be singular or plural. These accompanying drawings are provided merely to explain these aspects and not to limit them.

DETAILED DESCRIPTION

Any reference to elements using terms such as "first" and "second" herein generally does not limit the number or order of these elements. Conversely, these names are used herein as a convenient way to distinguish two or more elements or element instances. Therefore, it should be understood that the terms "first" and "second" in the requested item do not necessarily correspond to the same names in the written description. Furthermore, it should be understood that references to the first and second elements do not indicate that only two elements can be used or that the first element needs to precede the second element. Open terms such as "include," "comprise," "have," "contain," and the like used herein mean including but not limited to.

The term "coupled" is used herein to refer to direct or indirect electrical coupling between two structures. In indirect electrical coupling, one structure may be coupled with another through a passive element, such as a resistor, a capacitor, or an inductor.

In the present invention, terms such as "exemplary" or "for example" are used to represent "giving an example, instance, or description." Any implementation or aspect described herein as "exemplary" or "for example" is not necessarily to be construed as preferred or advantageous over other aspects of the present invention. The terms "about" and "approximately" as used herein concerning a specified value or characteristic are intended to represent within a value (for example, 10%) of the specified value or characteristic.

First Embodiment

Figure 1:
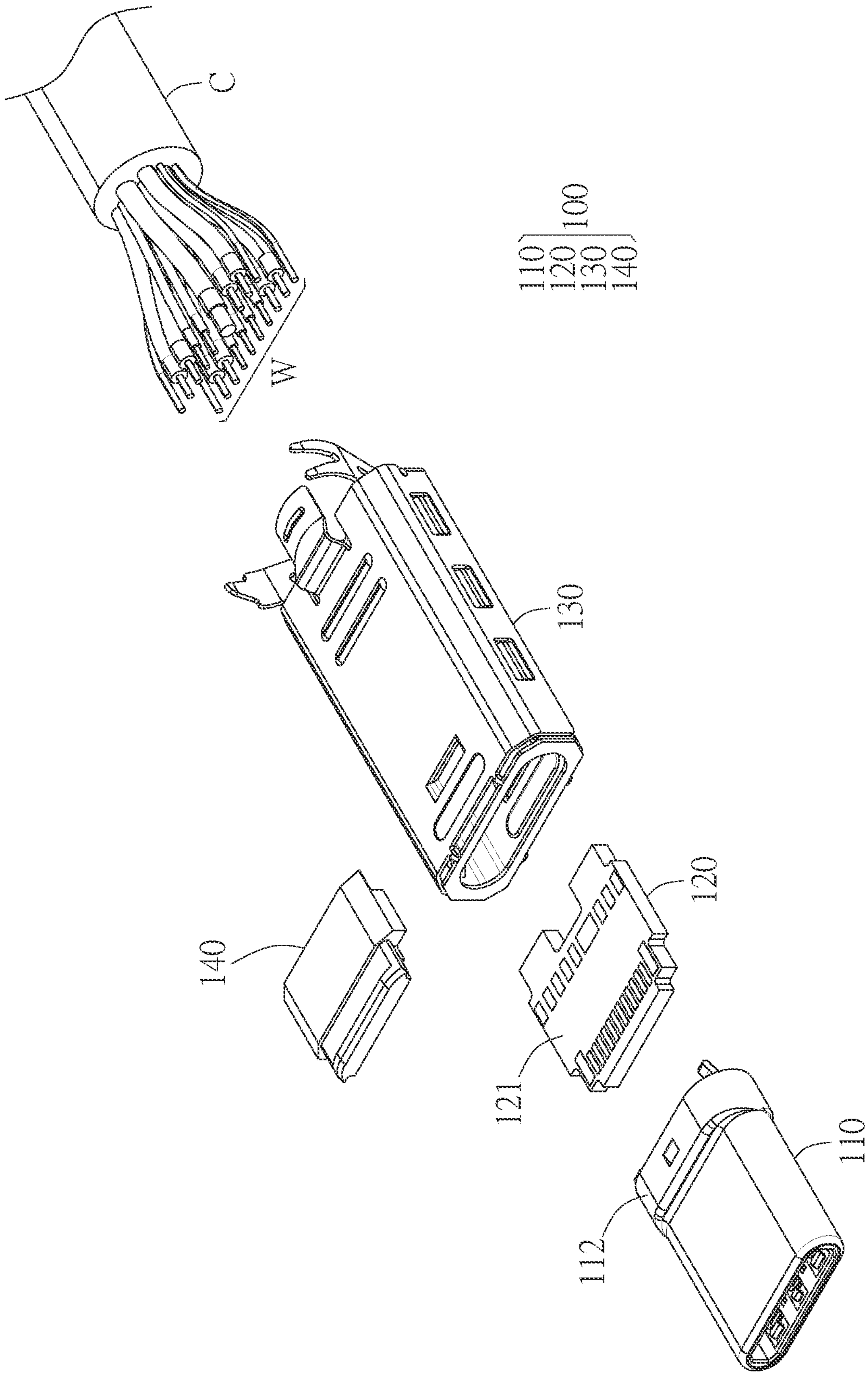
FIG. 1 is a first-perspective schematic diagram of the decomposition of the connector module and the cable according to the first embodiment of the present disclosure.
Figure 2:
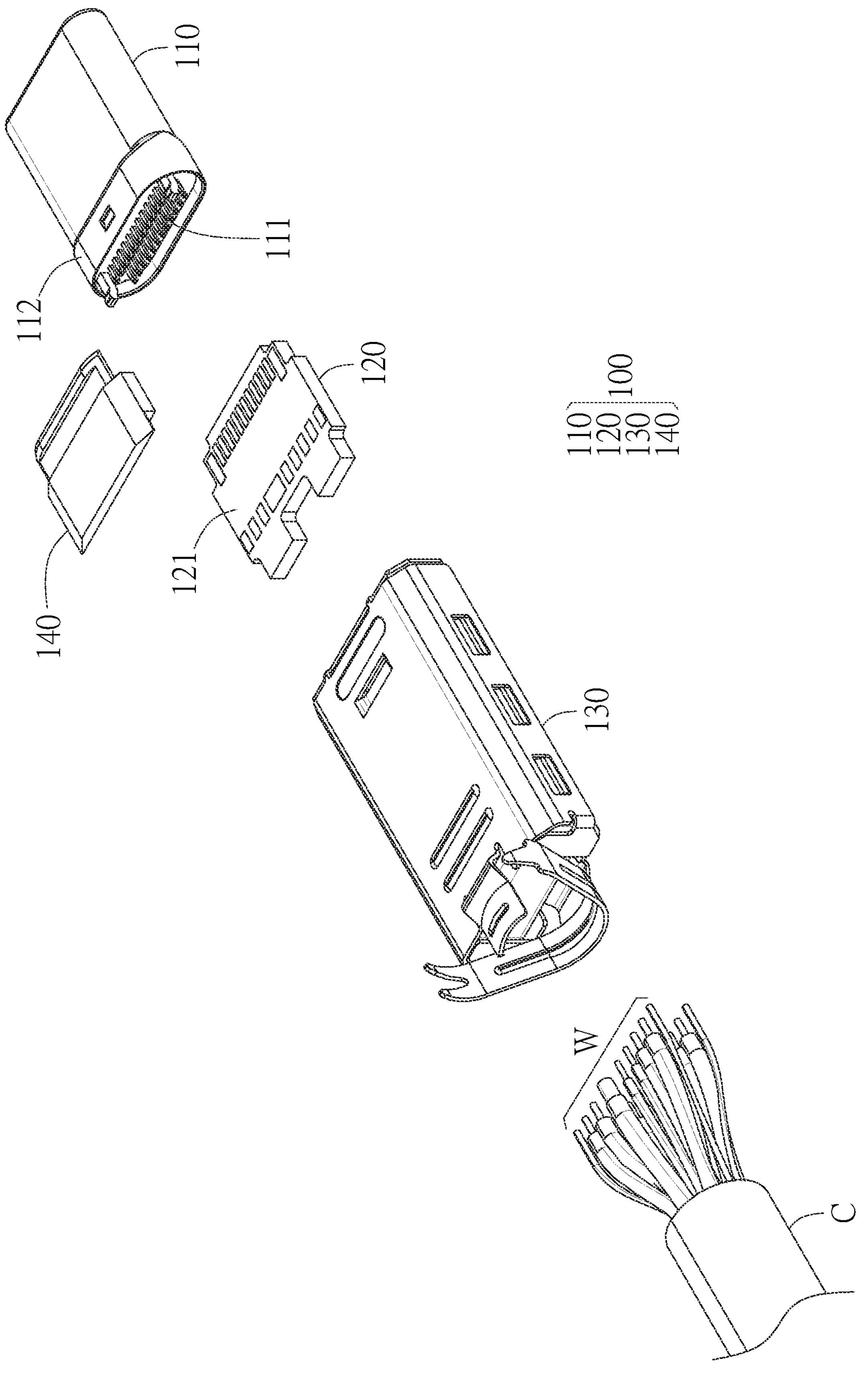
FIG. 2 is a second perspective schematic diagram of the decomposition of the connector module and the cable according to the first embodiment of the present disclosure.

Reoffering to FIGS. 1-2, FIGS. 1-2 illustrates the connector module 100. The connector module 100 includes the connector 110, the circuit adapter board 120, the shell 130, and the first insulation sheet 140. The connector 110 has at least one terminal pin 111 and the housing 112. The circuit adapter board 120 is configured to couple with at least one terminal pin 111 electrically and at least one wire (W) of the cable (C). The shell 130 is configured to cover the circuit adapter board 120 and at least a portion of the housing 112. The first insulation sheet 140 is arranged over the first surface 121 of the circuit adapter board 120 and located in the shell 130.

Specifically, the connector 110 can be a plug or a socket. A plug refers to a male connector or pin as a male contact to insert a socket. On the other hand, a socket refers to a female connector, a holder, or an opening socket that is used for setting male contacts. Usually, a person skilled in the art will know that the plug and the socket can be equivalently exchanged and/or substituted without affecting the implementation of the present disclosure. On the other hand, the connector 110 of the present disclosure corresponds to various specifications. For example, connector 110 of the present disclosure may be a USB, HDMI, DP, or other connector configured to transmit high-frequency signals, but it is not limited.

Figure 3:
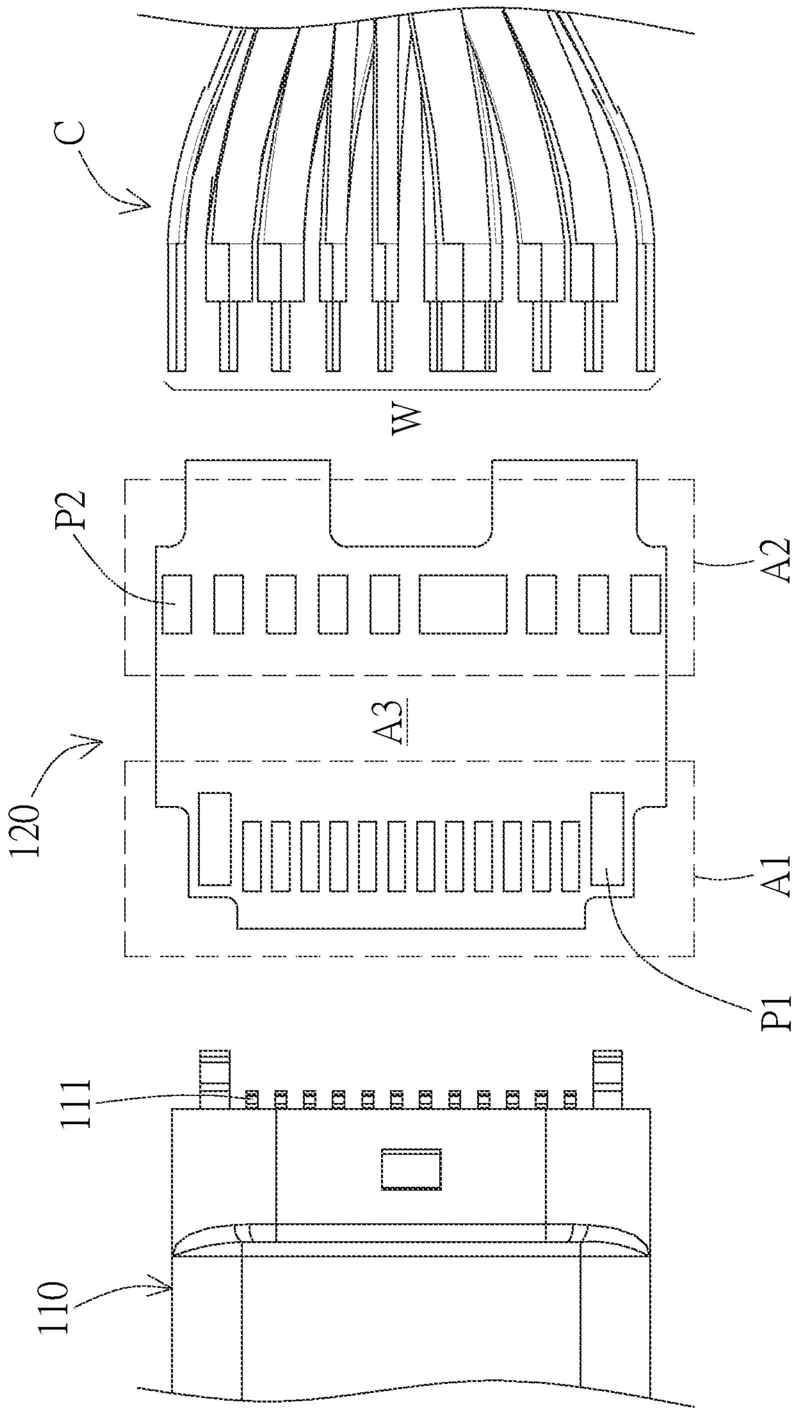
FIG. 3 is a schematic diagram of the circuit adapter board's surface configuration according to the first embodiment of the present disclosure.

Referring to FIG. 3, the circuit adapter board 120 can be a printed circuit board (PCB) or any appropriate substrate for the circuit. The first setting area (A1) of the circuit adapter board 120 is configured to connect with the connector 110. The first setting area (A1) is set according to the number and/or type of terminal pins of the connector 110. For example, the first setting area (A1) of the circuit adapter board 120 is located at a portion of the circuit adapter board 120 near the connector 110. The first setting area (A1) portion may be on the first surface 121 and/or the second surface 122 of the circuit adapter board 120. The first contact pad group (P1) is set on the first setting area (A1) and configured to contact the corresponding terminal pins 111 of the connector 110. Each of the terminal pins 111 of the connector 110 is electrically coupled to the corresponding contact pad of the first contact pad group (P1). The means for electrically coupling the terminal pins 111 and the first contact pad group (P1) may be selected from pin connections, welding, or wiring. Each contact pad of the first contact pad group (P1) is electrically coupled to the corresponding contact pad of the second contact pad group (P2) by conducting wires preset on the circuit adapter board 120. The second contact pad group (P2) is located on the second setting area (A2) of the circuit adapter board 120. More specifically, the second setting area (A2) is located at a portion of the circuit adapter board 120 near the cable (C). It may be located on the first surface 121 and/or the second surface 122 of the circuit adapter board 120. The second contact pad group (P2) and the first (P1) are electrically connected by the layout path of the circuit adapter board 120, but not limited to. The wires (W) of the cable (C) can be set on the contact pads of the second contact pad group (P2) through welding or other conventional means to electrically coupled with the corresponding terminal pins 111 of the connector 110. It should be noted that the number of contact pads of the first contact pad group (P1) does not need to be equal to that of the second contact pad group (P2). It should be understood that the number of contact pads of the first contact pad group (P1) and/or the number of contact pads of the second contact pad group (P2) depends on the type of connector 110 and the type of cable (C). On the other hand, the circuit adapter board 120 also has the component setting area (A3). The component setting area (A3) may be located at any appropriate position on the circuit adapter board 120, preferably between the first setting area (A1) and the second setting area (A2), to make the layout path for the components and contact pads more concise. It should be noted that the present disclosure is not limited to the region or size of the first setting area (A1), the second setting area (A2), and/or the component setting area (A3). In addition, the present disclosure is not limited to the setting of the first contact pad group (P1), the second contact pad group (P2), and/or the layout path of the circuit adapter board 120. In addition, although the layout path is not shown in FIG. 3, the layout path can be formed by any conventional means to implement the embodiment.

Figure 4:
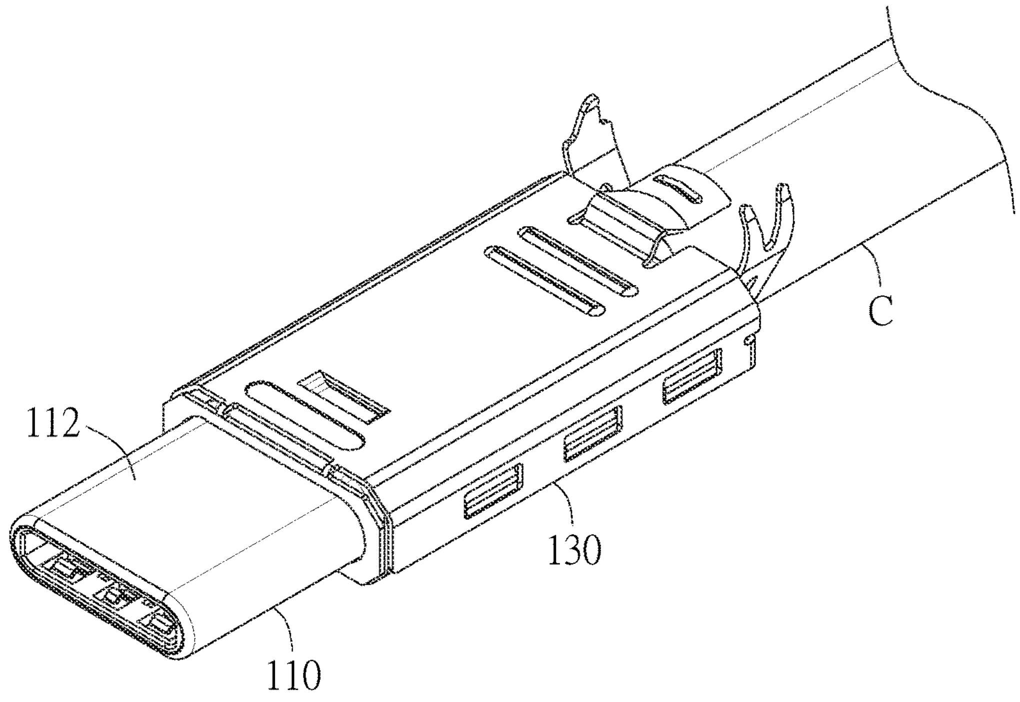
FIG. 4 is a schematic diagram of the combination of the connector module and the cable according to the first embodiment of the present disclosure.
Figure 5:
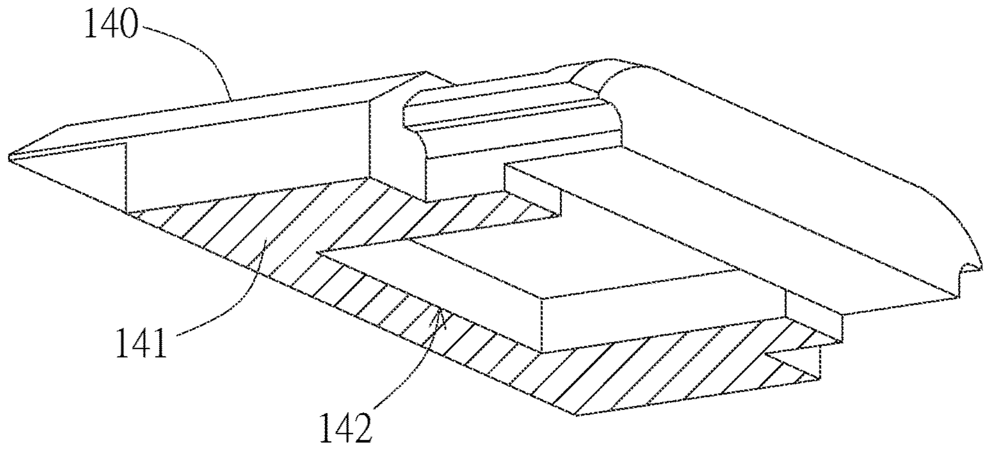
FIG. 5 is a schematic diagram of a perspective view of the first insulation sheet according to the first embodiment of the present disclosure.
Figure 6:
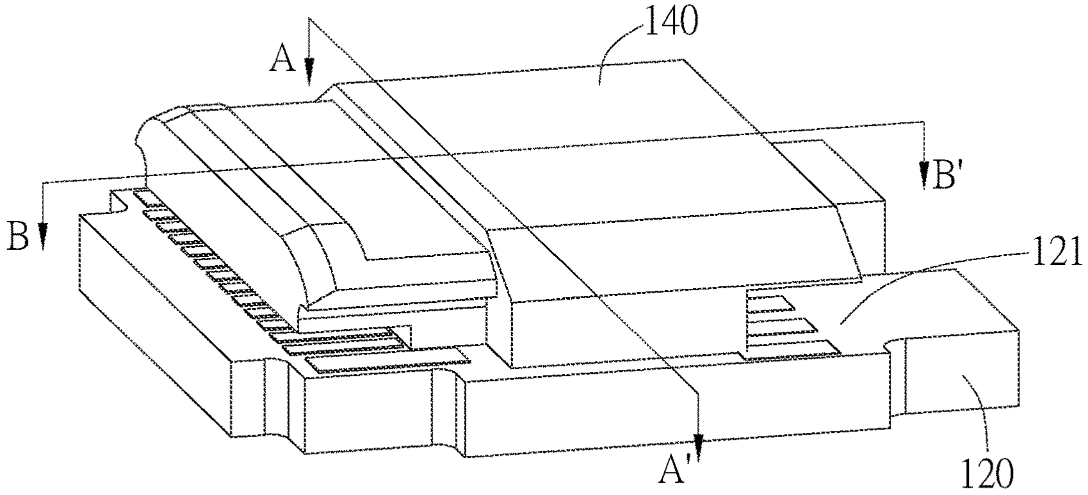
FIG. 6 is a schematic diagram of the first insulation sheet set on the circuit adapter according to the first embodiment of the present disclosure.
Figure 7:
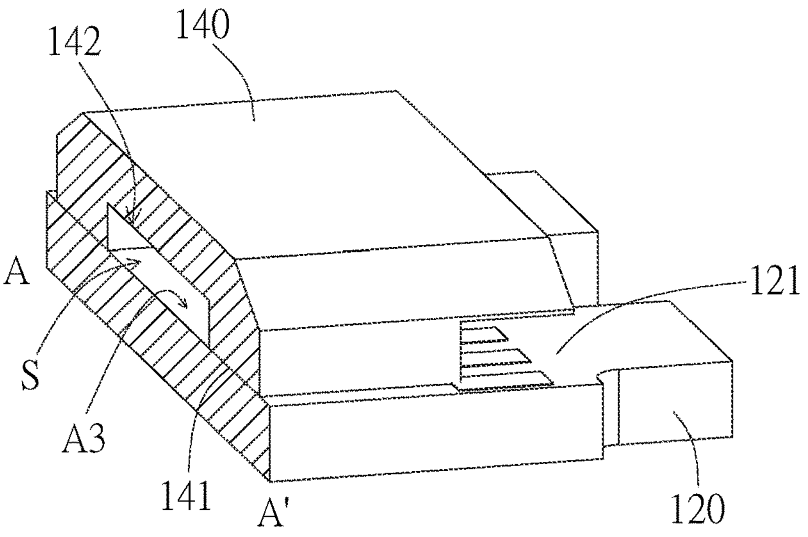
FIG. 7 is the first cross-sectional view of the first insulation sheet set on the circuit adapter board according to the first embodiment of the present disclosure.
Figure 8:
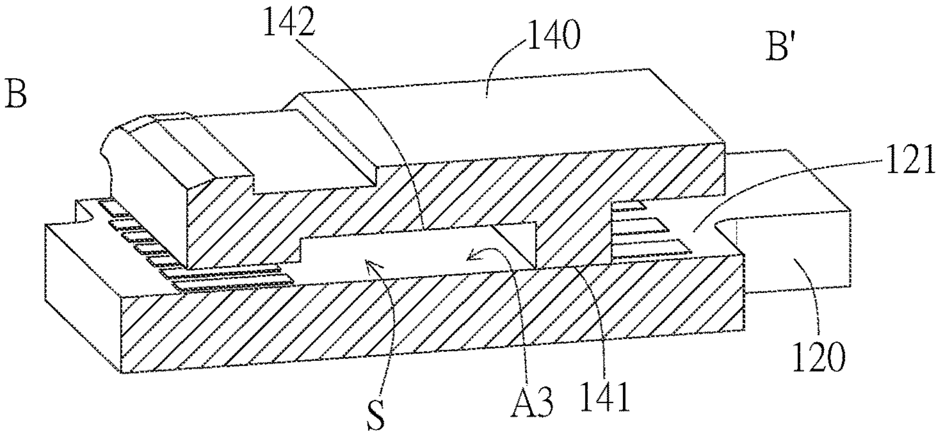
FIG. 8 is the second cross-sectional view of the first insulation sheet set on the circuit adapter board according to the first embodiment of the present disclosure.

As shown in FIG. 4, shell 130 is, for example, a metal or a shell with at least one conductive layer. The shell 130 is preferably electrically coupled to the grounding terminal to reduce noise interference. The shell 130 is electrically coupled to and structurally combined with the housing 112 of the connector 110. Therefore, the overall structural strength and the ability to resist noise are also improved. The shell 130 is tightly fitted with the first insulation sheet 140. Hence, shell 130 applies compressive stress to the first insulation sheet 140 to make the first insulation sheet 140 stable and installed on the circuit adapter board 120. The compressive stress provided by shell 130 may further apply to the soldered pads or components on the circuit adapter board 120 to make the connections of the soldered pads or components more stable. The shell 130 also makes the connector module 100 assembled with the cable (C) more cohesive and improves the stability of the connector module 100 during use.

Referring FIGS. 5-8, the first insulation sheet 140 has the inner cavity structure 142. The inner cavity structure 142 creates the space(S) between the first insulation sheet 140 and the first surface 121. The first insulation sheet 140 can be made of insulating and malleable materials such as plastic or rubber. The first insulation sheet 140 can be produced by injection molding, 3D printing, or other suitable processes to achieve uniform size and quality. The first insulation sheet 140 is installed on the first surface 121 of the circuit adapter board 120. The first insulation sheet 140 is not in full contact with the first surface 121. More specifically, the inner concave structure 142 is formed on the first surface 141 of the first insulation sheet 140 facing the first surface 121 of the circuit adapter board 120. The inner concave structure 142 is inward recessed from the first surface 141. The inner concave structure 142 does not contact the first surface 121 but forms the space(S) between the first insulation sheet 140 and the first surface 121 of the circuit adapter board 120. On the other hand, the other portion of the first surface 141 of the first insulation sheet 140, which is not inward to form the inner cavity structure 142, is attached to the first surface 121 of the circuit adapter board 120. Therefore, the first insulation sheet 140 is not in complete contact with the first surface 121. The position and depth of concavity of structure 142 (i.e., the size or area of the space(S)) can be determined by the disposed position or size of at least one circuit component on the circuit adapter board 120. The least one circuit component may refer to active chips, passive components, and/or conductive lines for transmitting high-frequency signals set on the component setting area (A3) of the first surface 121 of the circuit adapter board 120. Accordingly, the inner cavity structure 142 position corresponds to the circuit components mounted on the component setting area (A3). In addition, the depth of concavity of the inner cavity structure 142 can be determined by the size/height of the circuit components mounted on the component setting area (A3).

In the embodiment, the first insulation sheet 140 isolates shell 130 and at least one conductive portion of the circuit adapter board 120. At least one conductive portion of the circuit adapter board 120 includes the grounding and non-grounding portions. The first insulation sheet 140 is, preferably, used to isolate the shell 130 from the non-grounding portion. Specifically, shell 130 may be coupled to the grounding portion. Therefore, the first insulation sheet 140 prevents the non-grounding portion of the conductive portion on the circuit adapter board 120 from directly contacting shell 130 and causing a short-circuit problem. The first insulation sheet 140 doesn't need to block the grounding portion on the circuit adapter board 120 from coming into contact with the shell 130. The area to be blocked by the first insulation sheet 140, such as whether to isolate the grounding portion on the circuit adapter board 120 with the shell 130 or other grounding parts, can be determined based on design requirements or grounding requirements. Accordingly, the shape and size of the first insulation sheet 140 are free to be adjusted to make the first insulation sheet 140 easy to produce or install.

Figure 9:
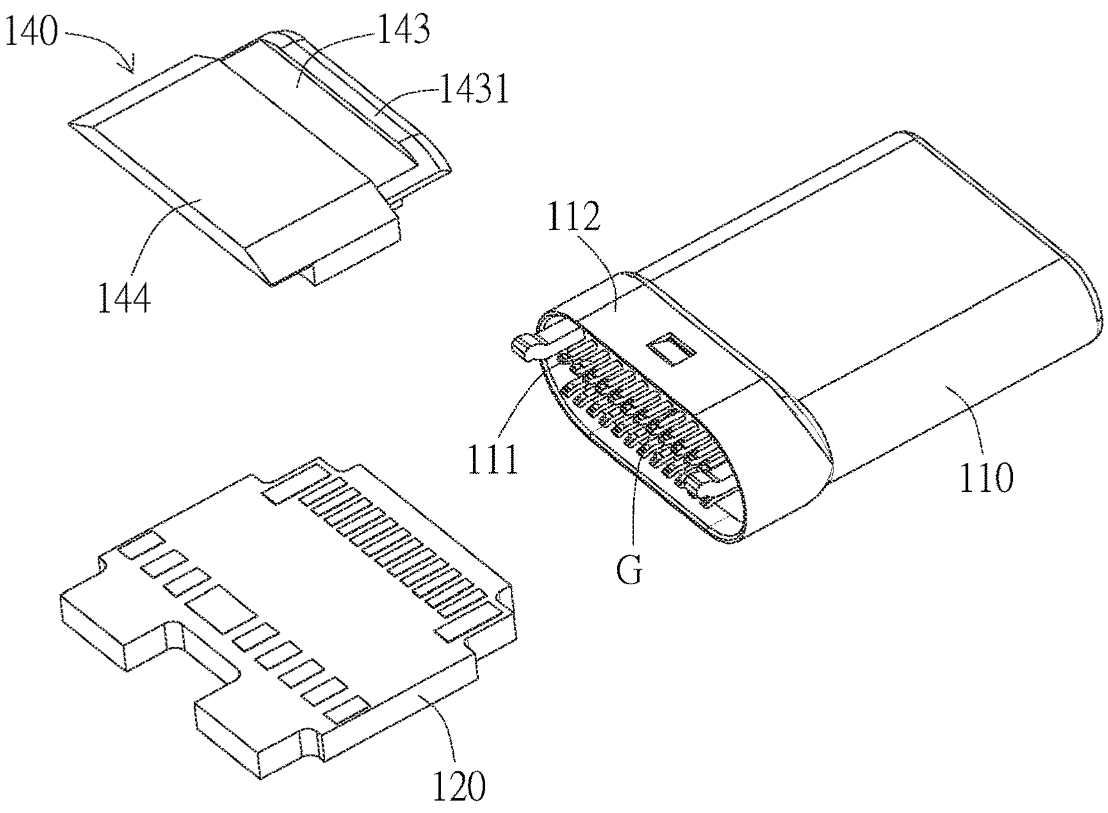
FIGS. 9-10 are schematic diagrams of the first insulation sheet set on the circuit adapter board and the connector according to the first embodiment of the present disclosure.
Figure 10:
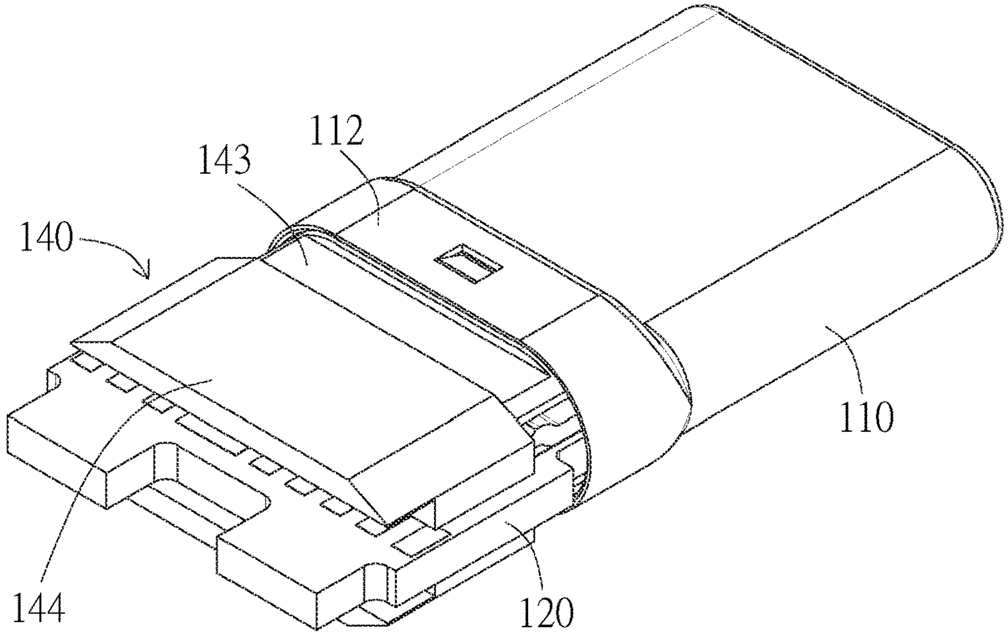

FIGS. 9 and 10 illustrate an application example of the embodiment. Referring to FIGS. 9 and 10, the first insulation sheet 140 further has the first protrusion portion 143. The first protrusion portion 143 is extended between at least one terminal pin 111 and the housing 112 of the connector 110. Specifically, a gap (G) is located between at least one terminal pin 111 and the housing 112 of the connector 110. The first protrusion portion 143 is extended and inserted into the gap (G). The first protrusion portion 143 is, preferably, configured to apply compressive stress, e.g., provided by the shell 130, to the terminal pin 111. With the first protrusion portion 143, the terminal pin 111 can be wholly insulated from housing 112 or the outer shell. From the aspect of mechanical structure, the first protrusion portion 143 applies the compressive stress to terminal pin 111; the compressive stress makes the connection between terminal pin 111 and the contact pad of the first contact pad group (P1) more stable and tighter. Therefore, the structural strength and stability can be improved. Preferably, the first protrusion portion 143 may have a protruding portion 1431. The protruding portion 1431 can be pressed upwards against housing 112 or hooked with housing 112 through an upward hook-like structure. Because the protruding portion 1431 provides more support points to the first insulation sheet 140, the protruding portion 1431 makes the first insulation sheet 140 more stable. From the aspect of electrical properties, the medium surrounding each contact pad of the first contact pad group (P1) and the terminal pin 111 of the connector 110 is maintained as air. Therefore, the dielectric coefficient of the medium surrounding each contact pad of the first contact pad group (P1) and the terminal pin 111 of the connector 110 is more accessible to estimate and less prone to change than the usage of the curing agent. Therefore, the impedance matching during the transmission of high-frequency signals is also easier to fit with the original design. Proper impedance matching can improve the efficiency of high-frequency signal transmission.

In the application example of the embodiment, similar to the first protrusion portion 143, the first insulation sheet 140 may have a second protrusion portion 144. The second protrusion portion 144 covers at least one wire (W) of the cable (C) set on the circuit adapter board 120. It should be noted that the term "cover" can be referred to as the means for covering in a contact or non-contact manner. More specifically, an example of contact manner can be that the second protrusion portion 144 is directly pressed with at least one wire (W) and/or applies compressive stress to at least one wire (W) set on the second contact pad group (P2). The second promotion portion, 144, provides a better insulation performance to isolate at least one wire (W) and the shell 130. The compressive stress, provided by the second protrusion portion 144, makes at least one wire (W) and the contact pad of the second contact pad group (P2) stabler and tighter. When the cable receives tension, the second protrusion portion 144 can make the wire more stable to avoid poor contact problems such as solder detachment. On the other hand, regarding an example of a non-contact manner, the second promotion portion 144 is located above the second contact pad group (P2). The second promotion, portion 144, provides insulation protection to at least one wire (W) set on the second contact pad group (P2). In summary, similar to the first promotion portion 143, the function of insulation and structural strengthening is carried out through the second promotion portion 144, the medium surrounding each contact pad of the second contact pad group (P2), and at least one wire (W) of the cable (C) is maintained as air. Therefore, compared to the usage of the curing agent, the dielectric coefficient of the medium surrounding each contact pad of the second contact pad group (P2) and at least one wire (W) of the cable (C) is easier to estimate and less to change. Therefore, impedance matching while transmitting high-frequency signals is also easier to fit with the original design. Proper impedance matching can improve the efficiency of high-frequency signal transmission.

The embodiment's space(S) can be filled with any medium. Specifically, when designing the impedance matching of the circuits, the dielectric coefficient of the medium filled in the space(S) will be considered an important parameter during the design process. Importantly, estimating the dielectric coefficient of the medium in the space (S) is a straightforward process. For example, if the medium in the space(S) is air, the dielectric coefficient of air can be used as a parameter for impedance matching design. On the other hand, the space(S) can be filled with curing agents or other materials with known dielectric coefficients, and the dielectric coefficients of curing agents or other fillers can be used as parameters for impedance matching design. In this embodiment, due to the space's fixed range, size, and shape (S), the dielectric coefficient of the filled curing agent is easy to estimate and can be controlled. Therefore, impedance matching for the circuit design can be achieved in practical products with low errors.

In summary, the circuit adapter board 120 components are covered by the first insulation sheet 140. The first insulation sheet 140 can be treated as an inner layer for insulation between the circuit adapter board 120 and the shell 130. The first insulation sheet 140 will eliminate errors caused by factors such as the production methods or the coated curing agent and/or process differences between the operator to coat the curing agent without affecting the structural strength. From the aspect of electrical properties, the inner concave structure 142 of the first insulation sheet 140 creates the space(S) between the first insulation sheet 140 and the circuit adapter board 120. The dielectric coefficients of the medium surrounding the circuit components in the space(S) are fixed and not easily changed. Therefore, the dielectric coefficients surrounding the circuit components are controllable and predictable. In the circuit design process, an easily estimated dielectric coefficient helps the impedance matching fitted in actual products with low errors. Especially in high-frequency signal transmission, good impedance matching will reduce signal attenuation during signal transmission. Therefore, the transmission efficiency and stability are improved.

Second Embodiment

Figure 11:
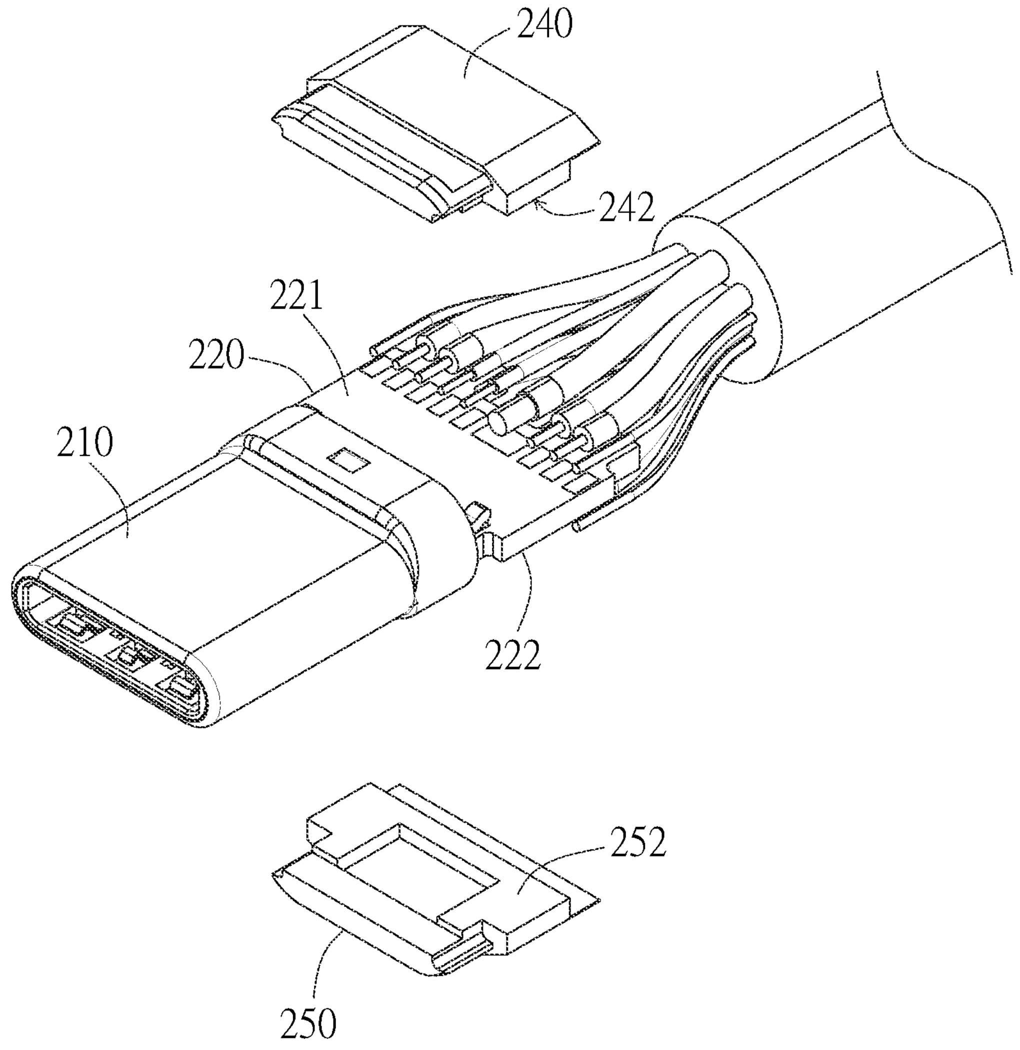
FIGS. 11-12 are schematic diagrams of the arrangement of the first and second insulation sheets according to the second embodiment of the present disclosure.
Figure 12:
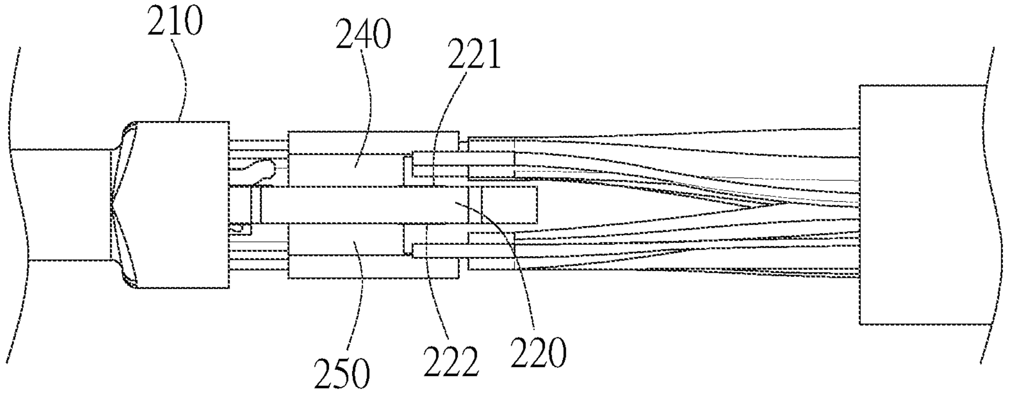

Referring FIGS. 11-12, the present disclosure embodies the connector module 200. The connector module 200 includes the connector 210, the circuit adapter board 220, the first insulation sheet 240, the shell (Omitted in the figure), and the second insulation sheet 250. The second insulation sheet 250 is arranged over the second surface 222, opposite the first surface 221, of the circuit adapter board 220 and located in shell 230. Specifically, the first surface 221 and the second surface 222 of the circuit adapter board 220 can be equipped with circuit components or contact pads. When circuit components or contact pads are set on the second surface 222, the second insulation sheet 250 is set on the second surface 222 to protect the circuit components mounted on the second surface 222. It should be noted that the second insulation sheet 250 may also have the inner cavity structure 252. However, the inner cavity structure 252 of the second insulation sheet 250 does not necessarily have to be at the same position, depth, shape and/or size as the inner cavity structure of the first insulation sheet 240 (not shown in FIG. 11). The position, depth, shape and/or size of the inner cavity structure 252 can be determined according to the circuit components set on the second surface 222.

Figure 13:
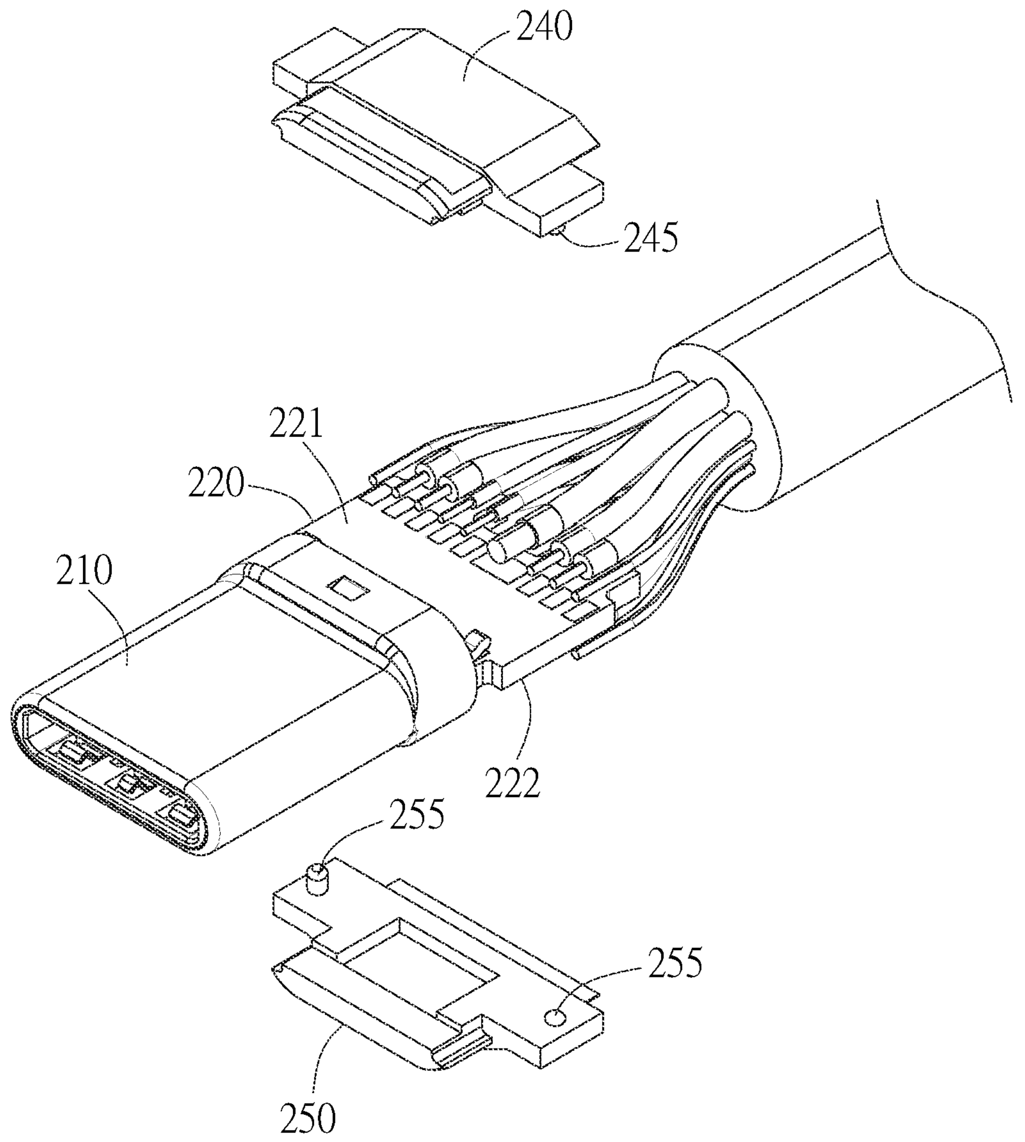
FIG. 13 is a schematic diagram of the coupling structure of the first and second insulation sheets according to the second embodiment of the present disclosure.

An application example of the embodiment is shown in FIG. 13. Referring to FIG. 13, the first insulation sheet 240 has a first coupling structure 245 that extends out the circuit adapter board 220, and the second insulation sheet 250 has a second coupling structure 255, corresponding to the first coupling structure 245, that extends out the circuit adapter board 220. The first coupling structure, 245, is configured to combine with the second coupling structure, 255. For example, the first coupling structure, 245, may be a pillar structure, and the second coupling structure, 255, may be a hole structure with a diameter corresponding to the pillar structure, but not limited to. The holes are tightly matched with the pillar structures. Combining the first coupling structure 245 and the second coupling structure 255 provides a stable installation of the first insulation sheet 240 and the second insulation sheet 250 on the circuit adapter board 220. Combining the first coupling structure 245 and the second coupling structure 255 can also provide compressive stress, improving the structural strength of the first insulation sheet 240 and the second insulation sheet 250. It should be noted that the first coupling structure 245 and the second coupling structure 255 can be combined by any conventional means for combining structures. In addition, the first insulation sheet 240 and the second insulation sheet 250 can be directly installed to the circuit adapter board 220 by conventional fixing methods such as tape or adhesive without the first coupling structure 245 and the second coupling structure 255. The present disclosure is not limited to the forms and combination methods of the first coupling structure 245, the second coupling structure 255, and the first insulation sheet 240 and second insulation sheet 250.

Third Embodiment

Figure 14:
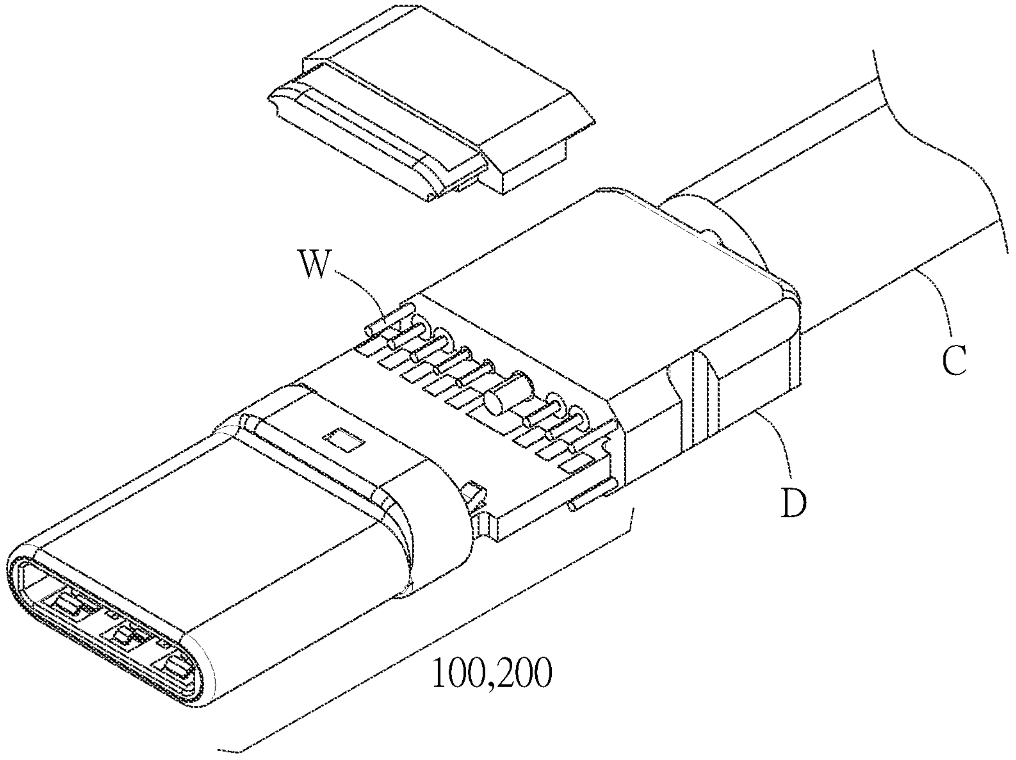
FIG. 14 is a schematic diagram of the signal transmission cable according to the third embodiment of the present disclosure.

FIG. 14 illustrates an embodiment of the signal transmission cable 300. The signal transmission cable 300 includes the cable (C) and the connector module 100 or the connector module 200 mentioned in the above embodiments. The connector module 100 or the connector module 200 is arranged at least one terminal of the cable (C). At least one cable (C) wire is electrically connected through the circuit adapter board to at least one terminal pin of the connector.

In the embodiment, the cable (C) wires are organized and welded to the circuit adapter board through the branching structure (D). The outer shell of the connector module 100 and/or the connector module 200 is configured to wrap with the branching structure to enhance the overall integrity of the signal transmission cable and improve the durability and stability of the signal transmission cable while transmitting signals.

By setting the first and/or second insulation sheets disclosed in the above embodiments, various circuit components on the circuit adapter board can be well insulating protected. From a physical aspect, the shell improves the structural strength of the connector module and the signal transmission cable by wrapping the insulation sheet(s) and the circuit adapter board to integrate with the connector's housing. From the signal transmission aspect, the insulation sheet's inner cavity structure provides a homogenized medium with the regulated dielectric around the circuit components on the circuit adapter board. The dielectric coefficient of the homogenized medium can be estimated or controlled. The controllable dielectric coefficient of the medium prevents the dielectric coefficient of the surrounding medium of the circuit components from deviating from the original design. Also, it prevents the impedance matching of the actual product from matching or having errors with the original design. Therefore, the transmission efficiency and stability are improved.

The previous description of the present invention is provided to enable a person of ordinary skill in the art to make or implement the present invention. Various modifications to the present invention will be apparent to a person skilled in the art, and the general principles defined herein can be applied to other variations without departing from the spirit or scope of the present invention. Therefore, the present invention is not intended to be limited to the examples described herein but is in accord with the widest scope consistent with the principles and novel features of the invention herein.

What is claimed is:

1. A connector module for connecting a cable, comprising:

a connector having at least one terminal pin and a housing;

a circuit adapter board configured to electrically connect with the at least one terminal pin and at least one wire of the cable;

a shell configured to cover the circuit adapter board and at least a portion of the housing; and a first insulation sheet arranged over a first surface of the circuit adapter board, and located in the shell;

wherein the first insulation sheet has an inner concave structure to form a space between the first insulation sheet and the first surface.

2. The connector module of claim 1, further comprising a second insulation sheet arranged over a second surface of the circuit adapter board, and located in the shell, wherein the second surface is opposite to the first surface.

3. The connector module of claim 2, wherein the first insulation sheet has a first coupling structure extended out of the circuit adapter board, and the second insulation sheet has a second coupling structure extended out of the circuit adapter board; wherein the first coupling structure and the second coupling structure are connected.

4. The connector module of claim 1, wherein the first insulation sheet has a first protrusion portion inserted between the at least one terminal pin and the housing.

5. The connector module of claim 1, wherein the first insulation sheet has a second protrusion portion covered by the at least one wire mounted on the circuit adapter board.

6. The connector module of claim 1, wherein the space formed by the inner concave structure is determined by the position or size of at least one circuit component arranged on the first surface.

7. The connector module of claim 6, wherein the at least one circuit component includes an active chip, a passive component, or a conducting wire.

8. The connector module of claim 1, wherein the first insulation sheet is configured to isolate at least a part of a conducting portion over the circuit adapter board.

9. The connector module of claim 8, wherein the conducting portion includes a grounding portion and a non-grounding portion; wherein the first insulation sheet is configured to isolate the shell and the non-grounding portion of the conducting portion.

10. A signal transmission cable comprising:

a cable; and a connector module arranged at a terminal of the cable;

wherein the connector module comprises:

- a connector having at least one terminal pin and a housing;
- a circuit adapter board configured to electrically connect with the at least one terminal pin and at least one wire of the cable;
- a shell configured to cover the circuit adapter board and at least a portion of the housing; and
- a first insulation sheet arranged over a first surface of the circuit adapter board and located in the shell;

wherein the first insulation sheet has an inner concave structure to form a space between the first insulation sheet and the first surface;

wherein the at least one wire of the cable is electrically connected, through the circuit adapter board, to the at least one terminal pin of the connector.

11. The signal transmission cable of claim 10, wherein the connector module further comprises a second insulation sheet arranged over a second surface of the circuit adapter board, and located in the shell, wherein the second surface is opposite to the first surface.

12. The signal transmission cable of claim 11, wherein the first insulation sheet has a first coupling structure extended out the circuit adapter boardff first coupling structure, and the second insulation sheet has a second coupling structure extended out the circuit adapter board; wherein the first coupling structure and the second coupling structure are connected with each other.

13. The signal transmission cable of claim 10, wherein the first insulation sheet has a first protrusion portion inserted between the at least one terminal pin and the housing.

14. The signal transmission cable of claim 10, wherein the first insulation sheet has a second protrusion portion covered by the at least one wire mounted on the circuit adapter board.

15. The signal transmission cable of claim 10, wherein the space formed by the inner concave structure is determined by the position or size of at least one circuit component arranged on the first surface.

16. The signal transmission cable of claim 15, wherein the at least one circuit component includes an active chip, a passive component, or a conducting wire.

17. The signal transmission cable of claim 10, wherein the first insulation sheet is configured to isolate at least a part of a conducting portion over the circuit adapter board.

18. The signal transmission cable of claim 17, wherein the conducting portion includes a grounding portion and a non-grounding portion, wherein the first insulation sheet is configured to isolate the shell and the non-grounding portion of the conducting portion.

* * * * *